United States Patent [19]

Moody, Jr. et al.

Best Available Copy

[11] E Re. 30,499

[45] Reissued Feb. 3, 1981

[54] INJECTION COOLING OF SCREW COMPRESSORS

[75] Inventors: Harold W. Moody, Jr., Farmington; Clark B. Hamilton, Wethersfield, both of Conn.

[73] Assignee: Dunham-Bush, Inc., West Hartford, Conn.

[21] Appl. No.: 525,261

[22] Filed: Nov. 19, 1974

Related U.S. Patent Documents

Reissue of:

[64] Patent No.: 3,795,117
Issued: Mar. 5, 1974
Appl. No.: 285,695
Filed: Sep. 1, 1972

[51] Int. Cl.[3] ..... F25B 1/00

[52] U.S. Cl. ..... 62/117; 62/228; 62/505; 62/197

[58] Field of Search ..... 62/197, 505, 196, 222, 62/193, 468, 469, 470, 471, 201, 117; 418/201

[56] References Cited

U.S. PATENT DOCUMENTS

| | | | |
|---|---|---|---|
| 2,776,542 | 6/1957 | Cooper | 62/505 X |
| 3,129,877 | 4/1964 | Nilsson | 418/201 |
| 3,210,958 | 10/1965 | Coyne | 62/505 |
| 3,226,949 | 1/1966 | Gamache | 62/226 X |
| 3,250,460 | 5/1966 | Cassidy et al. | 62/505 UX |
| 3,388,559 | 6/1968 | Johnson | 62/505 |
| 3,432,089 | 3/1969 | Schibbye | 62/505 X |

FOREIGN PATENT DOCUMENTS

| | | |
|---|---|---|
| 958198 | 1/1957 | Fed. Rep. of Germany . |
| 1401496 | 11/1968 | Fed. Rep. of Germany . |
| 1287309 | 8/1972 | United Kingdom . |

*Primary Examiner*—William E. Wayner
*Attorney, Agent, or Firm*—Sughrue, Rothwell, Mion, Zinn and Macpeak

[57] ABSTRACT

A liquid injection expansion valve permits liquid refrigerant at high pressure, bled from the condenser, to be injected into the working chamber between the screws and intermediate of the suction and discharge sides of a helical rotary screw compressor for cooling the refrigerant working fluid and the captured oil. A solenoid valve limits bleeding of liquid refrigerant from the condenser at high compressor loads. A thermostat sensing the temperature of the screw compressor discharge, modulates the liquid injection expansion valve downstream of the liquid injection solenoid valve. A compressor unloader slide valve may port oil and the liquid refrigerant into the working chamber. The condenser may be positioned at a height considerably above that of the screw compressor to increase the head of the bled liquid refrigerant to a pressure higher than the screw compressor discharge pressure. System oil pressure may be supplied to a fluid pressure operated, direct acting, on-off control valve upstream of the liquid injection expansion valve and within the bleed line, under control of a solenoid valve which is responsive to the temperature of the oil leaving the oil pump, where such temperature is proportional to compressor loading.

25 Claims, 10 Drawing Figures

206
208
240
254
244
252
248
268
246
218
266
260
242
250

260
238
236
206
270
220
242
272
252
204
224
248
268
246
282
276
286
284
274
219
218
280
250

57
56
98
100
92
80
46
90
94
96
84
82
90
86
53
88
52

10
24
14
29
27
230
218
219
222
220
226
224
26
228
240
200
210
40
232
238
216
256
236
214
212
234
206
202
208
242
204

INJECTION COOLING OF SCREW COMPRESSORS

Matter enclosed in heavy brackets [ ] appears in the original patent but forms no part of this reissue specification; matter printed in italics indicates the additions made by reissue.

BACKGROUND OF THE INVENTION

1. FIELD OF THE INVENTION

This invention relates to helical, rotary screw compressors, and more particularly, to a simplified system of liquid injection to control and limit the discharge temperature of the refrigerant working fluid and the lubricating oil carried thereby.

2. DESCRIPTION OF THE PRIOR ART

In general, compressors are pumps that are used to raise gases or refrigerant from one pressure level to a higher pressure level. In the process, the vapor or gas is superheated by the work of compression. Through thermodynamic relationships, operating temperatures can be predicted by applying isotropic or polytropic compression processes. With all types of compressors, the higher the compression ratio

[compression ratio=(discharge pressure/section pressure)]

the higher the discharge temperature that will be reached.

It is desirable to control and limit discharge temperatures so that dangerous levels are not reached that may injure components and lubricants and shorten their useful life. In the past, many methods have been employed to inject fluids into gas streams for the purpose of cooling or limiting compressor discharge temperature. In air compressors, water mist has been sprayed into the compression area, which vaporizes during compression to thereby limit temperatures. In other compressors, oil injection has been used to accomplish lower discharge temperature.

Attempts have also been made to inject liquid refrigerant into the refrigerant vapor or working fluid as it is being compressed. This has been accomplished by injecting liquid refigerant or refrigerant rich oil into the suction side of the compressor where the refrigerant evaporates and reduces the net inlet suction volume of the compressor, decreasing the capacity of the compressor. Attempts have further been made to add liquid to the gas discharge from the compressor.

In the conventional systems employing axial screw compressors, the need for oil cooling limits the discharge temperatures that the system can tolerate. In systems with water cooled oil coolers, the range of operation is usually established by water temperatures available. In the case of minimizing the use of water or in air cooled systems due to the ambient temperature of the air, there is a problem in maintaining tolerable discharge temperatures. One way of maintaining the discharge temperatures is through the use of liquid injection along with some oil injection. In such a case, location of the port for the liquid injection is critical in that, if the liquid injection port is on the inlet or suction side of the machine, the effect of the liquid being injected greatly affects the volumetric efficiency of the compressor due to the fact that the liquid will expand, flash off as it hits the low pressure environment. There is also an effect on the horsepower requirements of the machine, because the expanded liquid then is in gas form and goes through a pressure range change and exits at the machine discharge pressure.

If the point of liquid injection occurs as the discharge side of the machine or after the gas has actually left the compressor discharge area, not only is the pressure condition at the system highest and thus there is an inherent requirement for an external pump to pressurize the liquid to be injected above the maximum compressor pressure of the system, but the added unit constitutes an extra component which adds to the cost of the unit, and affects the reliability of the system. Most importantly, where compressive systems are designed hermetically, there is a rather confined distance from the point of compressor gas discharge from the screw compressor itself to where the same gas contacts and envelops the motor winding of the hermetic electric motor and the space between the two does not provide sufficient time or room for the liquid injected at this point to properly expand and cool the discharge gas prior to entering the motor compartment.

Conventionally, lubricating oil has been injected into the working chamber, that is, the space occupied by the intermeshed screws in a helical rotary screw compressor, for the dual purposes of lubricating the intermeshed screws and to provide the necessary seals between the rotating screws and the stationary housing. Further, since the load on the compressor varies at times between relatively large limits, the capacity of helical rotary screw compressors has been modified by incorporating a capacity control slide valve within the rotor housing and slidable parallel to the axis of the screw. Axial movement of the valve is programmed by a solid state, temperature initiated hydraulic actuated control arrangement. The slide valve shifts longitudinally between limits with the slide valve in closed position and against a valve stop when the compressor is fully loaded, in which case all the gas flows through the rotor housing from the intake to the discharge side of the screw compressor. Unloading is achieved by moving the valve away from the valve stop to create an opening within the rotor housing through which the suction gas can return to the inlet port area before compression of the same. Thus, in principle, enlarging the opening in the rotor housing effectively reduces compressor displacement. One mode of insuring that lubricating oil is injected into the working chamber and between the intermeshed screws has been to provide an axial passage in the mechanism connecting the slide valve to a reciprocating fluid motor and creating a closed chamber at the discharge side of the slide valve with one or more radial ports opening up into the working chamber downtream of the contact area between the end of the valve and the stationary valve stop. In this case, as the slide valve opens to reduce the capacity, oil injection occurs within the working chamber closer to the discharge side of the compressor.

It is, therefore, an object of the present invention to eliminate the necessity for a separate pump in liquid injection cooling of a screw compressor and to effect liquid injection cooling of a screw compressor without materially affecting the volumetric capacity of the compressor or increasing the horsepower required.

SUMMARY OF THE INVENTION

In general, the objects of the present invention are met in conjunction with a screw compressor operating as a component within a refrigeration system wherein compressed gas is condensed to high pressure liquid within a condenser and expanded in an evaporator or chiller for cooling a refrigeration load, and then returned as a low pressure gas to the inlet side of the screw compressor. The invention involves bleeding high pressure refrigerant liquid from the condenser and directing it through a liquid injection expansion valve and into the screw compressor working chamber intermediate of the suction and discharge sides of the same. A thermostat sensitive to the compressor discharge temperature or to compressor load either variably controls the volume of bled liquid refrigerant which is injected into the screw compressor, or cycles the bleed line on and off. A solenoid valve may be interposed in the bleed line intermediate of the condenser and the liquid injection expansion valve, with the solenoid valve being under control of a thermostat bulb sensitive to the temperature of the oil, preferably at the discharge side of the oil pump and downstream of the screw compressor. In another embodiment, the condenser is located at a height considerably above that of the screw compressor so that the gravity head acts in conjunction with the normal high pressure of the liquid refrigerant within the condenser to provide liquid refrigerant within the bleed line at a pressure considerably above the discharge gas pressure of the screw compressor so that the refrigerant may be injected into the screw compressor at the discharge side of the same or slightly upstream of the discharge side.

A helical rotary screw compressor employs a capacity control slide valve within the rotor housing movable away from a fixed valve stop for reducing the capacity of the compressor. A chamber carried by the valve may be supplied the bled liquid refrigerant which is ported into the working chamber, downstream of the end of the slide valve which contacts the stop when the compressor is fully loaded. The liquid refrigerant chamber may be sealed from a second chamber of the capacity control slide valve which ports lubricating oil into the compressor working chamber; the refrigerant chamber preferably being downstream of the oil chamber. Coaxial oil and liquid refrigerant lines may be coupled to the respective sealed chambers of the capacity control slide valve from opposite ends, or by means of concentric [passags] *passages* direct flow to the chambers of the slide valve or by means of parallel flow lines from the same end.

In another embodiment, a thermal expansion valve within the bleed line and responsive to the temperature of the compressor discharge gas modulates the flow of liquid refrigerant through the bleed line to the compressor injection port. An on-off valve is interposed in the bleed line [downstream] *upstream* from the thermal expansion valve and is operatively coupled to an oil pressure line at the discharge side of the oil pressure pump. The valve is direct acting in response to system oil pressure. The oil pressure line, in turn, carries a solenoid operated valve which is responsive to the temperature of the oil at the discharge side of the pump which is representative of compressor load. A by-pass oil line by-passes the oil pressure operated valve and carries a restriction or orifice between the valve and the sump.

DESCRIPTION OF THE PREFERRED EMBODIMENTS

Figure 1:
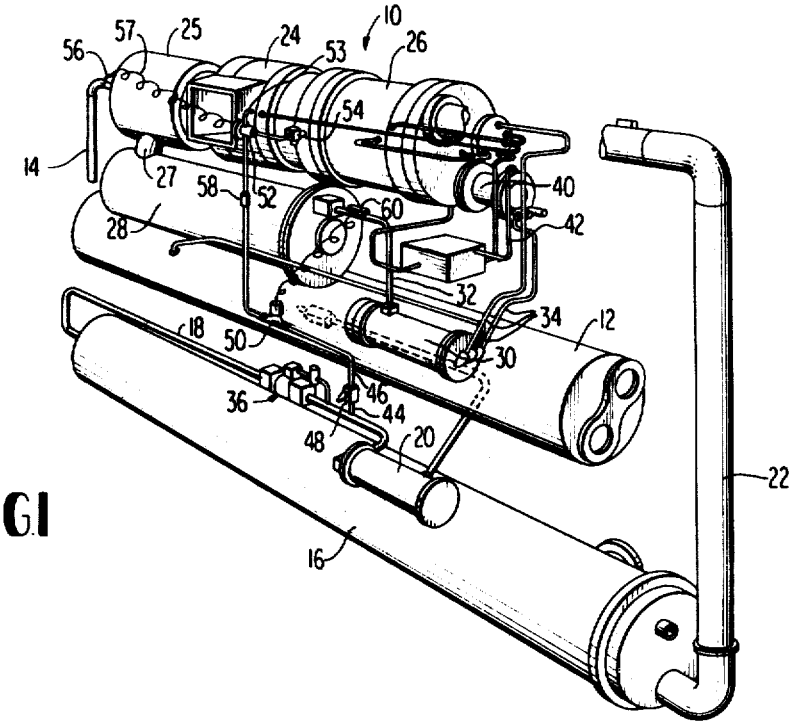
FIG. 1 is a perspective view of a preferred embodiment of the liquid refrigerant injection cooling system for a helical, rotary screw compressor.

Reference to FIG. 1 illustrates in perspective view a refrigeration system incorporating a helical, rotary screw compressor which employs the liquid refrigerant injection oil cooling system of the present invention, in one form. the principal components of the closed loop refrigeration system are: the helical, rotary screw compressor assembly 10; the condenser 12 which receives the compressor discharge through conduit 14; the chiller or evaporator 16, which is connected to the discharge end of the condenser 12 via conduit 18 and a filter drier 20 incorporated in conduit 18 intermediate of condenser 12 and chiller 16. Conduit 22 connects the discharge end of the chiller to the intake or inlet side of the axial screw compressor 10. Lubricating oil is circulated through the compressor assembly 10 and in fact mixes to a limited extent with the refrigerant working fluid, and is separated by oil separator 25 located after hermetic electric drive motor 24, at the downstream or discharge side of the screw compressor. The separated oil enters oil sump 28 through pipe 27 and is pressurized by an oil pump (not shown) at one end, prior to being returned to the compressor assembly 10 after passage through an oil cleaner or filter 30. The oil filter 30 receives oil from sump 28 through line 32 and discharges the same through a plurality of lines 34 at the discharge end of the oil filter 30. These components of the refrigeration system and the oil system are otherwise conventional.

In general, the refrigerant working fluid which may comprise freon or the like, enters the right hand end of compressor assembly at 10, through inlet 22 in gaseous or vapor form at relatively low pressure and is compressed by the helical rotary screw compressor 26 for discharge over and across the hermetic motor windings (not shown) of the electric motor 24 and exits from oil separator 25. The high pressure vapor discharge from the compressor passes through conduit 14 into the condenser 12 where the vapor is condensed by contact with tubes containing coolant such as water or air and is discharged therefrom through conduit 18 to filter drier 20. The high pressure liquid refrigerant then expands within chiller 16 to cool the load consisting of water or other heat exchange fluid within the chiller or evaporator 16. The expansion, modulation and delivery of liquid refrigerant to the evaporator or chiller 16 is suitably controlled by means 36 intermediate of the filter drier 20 and the intake side of the evaporator or chiller 16. Further, for the purposes of the present invention, lubricating oil at a relatively low temperature leaves the oil filter 30 via lines 34 to various points along the compressor assembly 10 for lubricating purposes or is employed as hydraulic motor fluid for one or more hydraulic motors such as that associated with compressor unloader 40, for instance, via line 42.

The present invention is directed to a liquid refrigerant injection system for limiting the discharge temperature of the compressor and thus the maximum temperature to which the system oil is subjected. In this respect, high pressure liquid refrigerant is bled from conduit 18 downstream of the filter drier 20 as at 44 by a small diameter bleed tube or line 46 through shut off valve 48. The liquid refrigerant passes through a solenoid valve 50 within bleed line 46 and flows to a liquid injection expansion valve 52 which modulates the flow of liquid refrigerant through the bleed line 46 and into the screw compressor 26, line 46 opening into the compressor working chamber intermediate of the discharge and suction sides of compressor 26. A second manually operable shut off valve 54 is positioned within the bleed line 46 intermediate of the screw compressor 26 and the liquid injection expansion valve 52 to assist in isolating the injection system. The liquid injection expansion valve 52 is of the modulating or variable flow type.

It is important to note that the solenoid valve 50 may be a pilot operated, solenoid energized, two position valve such as that produced by ALCO Controls Corporation of St. Louis, Missouri, a division of Emerson Electric Company, under the trade designation 230R8.

In this case, a thermostat bulb 60 may be filled with a temperature expansive material such as a liquid or gas, which operates a thermostat associated with the panel (not shown) causing the normally open contacts to close at a predetermined oil temperature which, in turn, closes the electrical circuit to the solenoid which is integral with valve assembly 50.

This is in contrast to the liquid injection expansion valve 52 which is nonelectrical in operation and which is coupled to a temperature expansion valve bulb 56 by a capillary tube 57. The bulb and capillary tube carry a temperature expansive material which may be liquid, gas or part liquid and part gas and which expands in response to increased temperature to variably shift a movable valve element within valve 52 to modulate the flow of liquid refrigerant to the injection port of the screw compressor 26. Essential to the operation of the expansion valve 52, is equalizing line 53 which couples the expansion valve 52 to the screw compressor 26 at the discharge side of the same.

Figure 5:
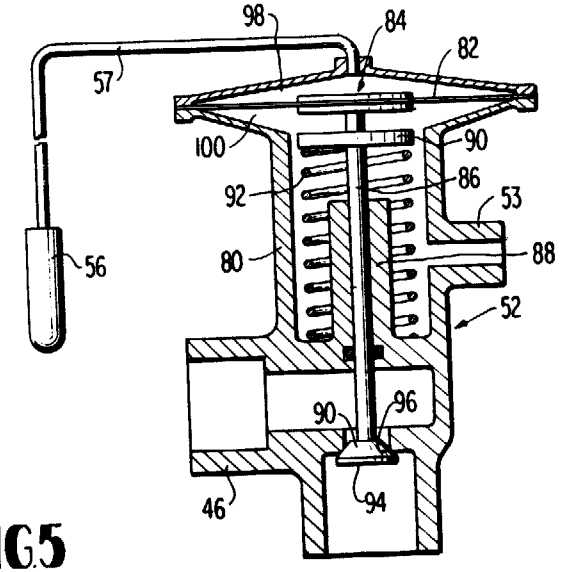
FIG. 5 is an enlarged sectional view of the liquid injection expansion valve employed in the liquid refrigerant injection cooling system of FIG. 1.

Turning to FIG. 5, it is noted that the liquid injection expansion valve 52 consists essentially of a dumb bell shaped valve housing or casing 80 expanding at its upper ends and supporting a diaphragm 82 across the chamber 84 defined by the end of the valve housing, the diaphragm 82 exerting pressure on a movable valve stem 86 which is movable axially, being supported by a fixed guide member 88, the stem carrying a disc 90 which is movable therewith, within housing 80 and against which one end of a compression spring 92 abuts, the other end abutting against the fixed guide means 88. The end of the valve stem 86 carries an enlarged diameter valve element 94, which is normally biased against an annular valve seat 96 preventing the liquid refrigerant in the bleed line 46 to pass through the horizontal inlet and discharge through the vertical outlet at the bottom of the casing. Chamber 84 is divided by the diaphragm into an upper section 98 which is coupled by means of capillary tube 57 to the bulb 56. Further, the equalizing line 53 opens up into the valve casing 80 and being in fluid communication with the lower section 100 of working chamber 84 and acting on the bottom of the diaphragm 82 in opposition to the pressure exerted by the thermo-expansive material which additionally fills the upper chambers section 98 as well as the capillary tube 57 and bulb 56.

The temperature responsive bulb 56 is operatively positioned with respect to the compressor discharge, that is, it is mounted on or adjacent to conduit 14 which couples the discharge side of the compressor to the inlet side of the condenser 12. Alternatively, it could sense oil temperature downstream of the oil separator 25, which is proportional to compressor load. However, this is only one of the parameters affecting the operating of the liquid injection expansion valve 52, the other being the pressure within equalizing line 53 which provides the valve 52 with a signal representative of condensing temperature and which acts on the opposite side of the diaphragm to the signal indicative of a compressor discharge temperature. The compressive force acting on the valve stem 86 through the fixed disc 90 and thus on the diaphragm in the same direction as the force emanating from the equalizing line 53, is purposely set to assist in keeping the valve closed in conjunction with the force representative of condensing temperature from line 53. The present invention is directed to a system in which it is desired to keep a fixed temperature differential between the condensing temperature and the compressor discharge temperature regardless of operating conditions of the helical rotary screw compressor. It is a characteristic of the oil separator 20 that it requires approximately a 35° temperature differential between the condensing temperature of the refrigerant and the discharge temperature of the refrigerant to operate efficiently. Depending upon the pressure that the oil experiences in the sump or at the oil separator and the temperature, the oil absorbs to a greater degree or to a lesser degree, refrigerant. If the temperature of the oil is less than 140° F., it has a tendency to pick up refrigerant. Valve 50 and bulb 60 insure that the temperature of the oil stays above 140° F. The function of valve 52 is to maintain a 45° superheat temperature difference between the condensing temperature and the discharge temperature. This is accomplished by selecting a spring having the desired spring constant and providing a charge within the power assembly, that is, the temperature responsive material within bulb 56 capillary 57 and the upper power assembly chamber section 98 and acting on the diaphragm 82 in opposition to the spring 90. Only under these two conditions will the valve open to variably supply the liquid refrigerant to the working chamber of the compressor in an attempt to maintain the desired conditions.

This may perhaps be best appreciated by reference to standard refrigerant pressure enthalpy curves wherein a compressor inlet condition is defined as an inlet pressure and an inlet temperature with the inlet temperature being above the saturated vapor level, for instance, which in that case, the refrigerant vapor has suction superheat, but if it lies on the saturated vapor line, the suction gas does not have superheat. During compressor operation, the predicted discharge temperatures basically follow an isotropic line on the pressure and enthalpy diagram. These lines are basically to the right of the saturated vapor line and, depending on the inlet conditions of the compressor, the compression ratio and the actual discharge pressure, the condition of the gas exiting from the compressor will be at different temperature levels, meaning that the actual temperature as compared to the condensing condition at which the compressor is operating will have various discharge superheats. The effect of the valve 52 is to fix the discharge superheat, that is, to maintain the same in terms of the minimum discharge superheat for proper system operation and, in particular, to insure proper operation of the oil separator.

The temperature responsive bulb 56 is operatively positioned with respect to the compressor discharge, and in the illustrated embodiment it is mounted on or adjacent to conduit 14 which couples the discharge side of the compressor to the inlet side of the condenser 12. Alternatively, it could sense oil temperatures downstream of oil separator 25, which is proportional to compressor load. Compressor discharge temperature, modulated by condensing temperature therefor, controls the flow rate of liquid refrigerant through the liquid injection expansion valve such that, in general, as the temperature of the compressor discharge increases, more liquid refrigerant is injected through the expansion valve which opens to a greater extent to increase the flow of liquid refrigerant to the screw compressor 26. Preferably, a sight glass 58 is placed in the bleed line 46 to visually ascertain the extent of refrigerant flow through that line.

In contrast, the solenoid valve 50 is an electrically powered on-off valve, which is responsive to oil temperature, to permit initial flow of refrigerant to the axial screw compressor 26 to limit the maximum temperature of the working fluid being compressed and thus the temperature rise of the oil within the system. In this respect, thermostatic bulb 60 senses the temperature of the oil from sump 28 at the discharge end of the same as it passes through conduit 32 prior to entering oil filter 30 and signals the solenoid of the liquid injection solenoid valve 50 to open the valve in response to rise in oil temperature to a predetermined minimum value of say 140° as previously described.

In operation of the embodiment of FIG. 1, liquid injection is not required by the machine during its off cycle or when the unit is running at low refrigeration loads, since at low loads, the discharge temperature of the compressor working fluid is at a point where additional cooling is not required. Since the temperature of the oil is a function of the temperature of the discharge working fluid from the compressor, the oil temperature at the oil pump outlet is insufficient to turn the solenoid valve on. Assuming the load on the chiller or evaporator 16 increases to the point where the oil temperature reaches the predetermined minimum level necessary to open the solenoid valve 50, liquid refrigerant flows through the bleed line 46, at slightly less than the discharge pressure from the compressor unit 10, to the liquid injection expansion valve 52. The thermostat bulb 56 modulates the volume of liquid injection *by* expansion valve 52 and only the amount of liquid refrigerant is injected into the compressor which is sufficient to maintain the gas discharge temperature within a predetermined range. Thus, as load increases, the discharge temperature of the working fluid increases and bulb 56 senses the demand for more liquid refrigerant to be injected into the screw compressor just upstream from the discharge side of the screws. Thus, as discharge gas temperature increases, the expansion valve 52 opens wider to deliver more liquid refrigerant through bleed line 46 to the compressor 26, and conversely as the load within the evaporator or chiller falls off, the compressor discharge temperature decreases and the expansion valve will throttle back to reduce the supply of liquid refrigerant delivered to the compressor. In the illustrated embodiment, it is not necessary to employ an external separate oil cooler. Since oil seeps into and forms a small part of the working fluid passing through the compressor, it must be separated therefrom prior to passing the refrigerant through the condenser and chiller or evaporator, since the presence of oil interferes with the heat transfer function of the refrigerant. After the working fluid passes through the separator which removes the oil from the refrigerant, it passes through conduit 14 to the intake side of condenser 12. Oil, in turn, accumulates within sump 28, then is driven by a pump back to the compressor assembly 10. The precentage of oil in the refrigerant which is a liquid and at relatively high pressure in the condenser, is very small, from zero to three percent or less and does not materially interfere with the liquid refrigerant which is injected through bleed line 46 just upstream from the discharge side of the screws. Some minor flashing or vaporization may occur intermediate of the liquid expansion valve and the port (not shown) within the screw compressor 26, but most of the expansion and vaporization takes place within the space defined between the lobes of the screws which space captures the working fluid gas which is compressed as it moves from the intake side to the discharge side of the intermeshed screws. The purpose of shutoff valves 48 and 54 is to isolate the bleed line components from the main components of the refrigeration system for maintenance purposes.

The thermostat 60 which is responsive to the temperature of the oil at the oil pump discharge and which controls the on-off solenoid valve 50, is positioned to be responsive to the temperature of the oil, since the outside surface of the oil line heats up much quicker than the outside surface of the refrigerant discharge conduit 14 and therefore the change in the oil temperature conduit surface anticipates the subsequent increase in the temperature of refrigerant working fluid conduit exterior surface and effects liquid refrigerant injection into the screw compressor at the time that injection is needed rather than at some point subsequent thereto.

From the above, it is seen that the present invention truly limits the discharge temperatures at the heart of the compressor and by selecting the point of injection of the liquid refrigerant, cooling is achieved without materially affecting the volumetric capacity of the compressor. Injection occurs when the suction stroke has been completed and the compression stroke is well in process, and may in fact occur just at the point of full compression prior to discharge from the compressor. Further, the injection of liquid refrigerant during the compression stroke permits the heat required to vaporize the liquid refrigerant to remove a significant part of the heat generated in the compression process and thereby materially reducing the discharge temperature of the working fluid and, of course, the maximum temperature to which the oil is subjected. Further, since the pressure level of the injected refrigerant is only slightly less than the discharge pressure of the working fluid, the horsepower requirement to raise the vaporized refrigerant to the full discharge pressure is minimum and the very small horsepower increase necessary to achieve this end does not seriously affect the overall efficiency of the compressor.

Figure 2:
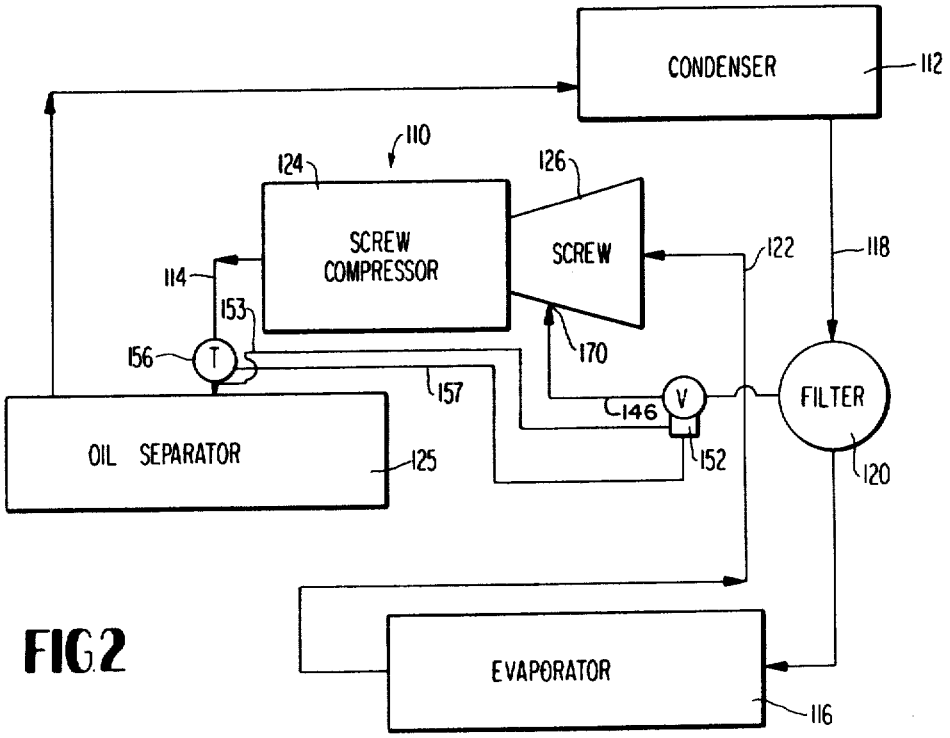
FIG. 2 is a schematic diagrammatic view of a refrigeration system employing another embodiment of the present invention.

Turning to FIG. 2, there is illustrated schematically a refrigeration system similar to that of FIG. 1 which incorporates liquid refrigerant injection for oil cooling purposes and when the liquid injection system components are modified to some extent. In this case, the screw compressor unit or assembly 110 comprises a screw compressor motor 124 for driving the screw compressor 126 which receives the gaseous or vaporous refrigerant working fluid through intake line 122 and compresses the same for discharge over the screw compressor motor 124, the high pressure vapors exiting from the screw compressor through discharge conduit 114. The oil separator 125 is illustrated schematically, in this case, as being downstream of the screw compressor motor and upstream of a conventional water cooled condenser and positioned within line 114 intermediate of a screw compressor assembly 110 and condenser 112. Again, high pressure liquid refrigerant leaves condenser 112 via conduit 118 and passes to the chiller or evaporator 116 via filter drier 120. Schematically, a liquid refrigerant bleed line 146 permits some of the high pressure liquid refrigerant to be bled to the screw compressor 126 for injection through an injection port 170 defined by the headed end of the arrow which lines intermediate of the suction and discharge sides of the screw compressor 126. Refrigerant vapor returns from the chiller or evaporator 116 to the suction side of the screw compressor through line 122.

The simplified liquid refrigerant injection control system in this embodiment, consists essentially of a thermostat in the form of a temperature sensitive bulb 156 which carries along with capillary 157, a temperature responsive material which upon expansion modulates the valve 152 to thereby variably increase the delivery of liquid refrigerant to the injection port 170 of screw compressor 126. In like manner to the embodiment of FIG. 1 equalizing line 153 provides a second input to valve 152 responsive to condensing pressure. While the system contains a temperature sensistive expansion valve 152 and while the valve modulates the flow of refrigerant in direct proportion to the temperature at the discharge side of the screw compressor unit 110 and while this variation simplifies the external components of the system, this variation in the control scheme may be less desirable, since it is necessary that the valve 152 maintain a good tight shut off condition, that is, one in which at no load or when the machine is in compressor off portion of the cycle, liquid refrigerant will not be injected into the working chamber through injection port 170. Alternatively, the bulb 156 could be operatively positioned at oil separator 125 and responsive to oil temperature at the separator or within the oil sump.

Figure 3:
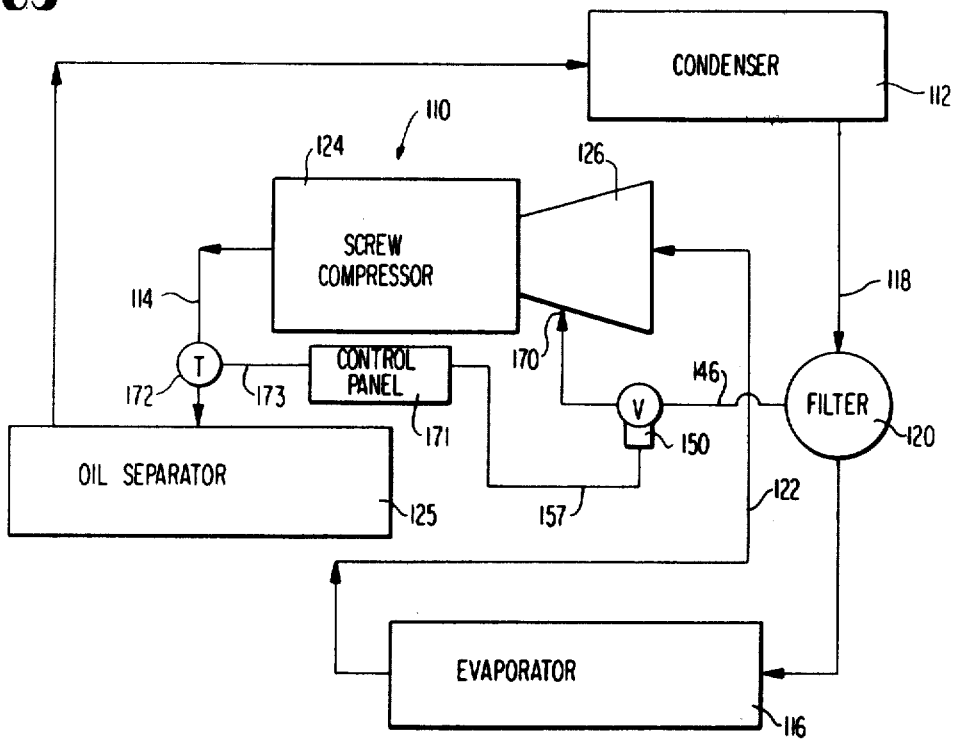
FIG. 3 is a schematic view of a refrigeration system incorporating a third embodiment of the liquid refrigerant injection cooling system of the present invention.

Turning to FIG. 3, a further embodiment of the present invention is shown for a refrigeration system which is identical in most respects to the refrigeration system of FIG. 2. In this case, similar components are given similar numerical designations. The only difference in this embodiment, is the fact that the bleed line 146 carries a solenoid operated on-off valve 150 similar to liquid injection solenoid valve 50 of the first embodiment and, in which case, the electric control line 157 provides electrical current to the solenoid under control of thermostat operated switch contacts at a control panel 171 intermediate a thermostat bulb 172 operatively associated with the discharge line 114 at the discharge end of the screw compressor assembly 110. Bulb 172 could alternatively be positioned so as to sense directly the temperature of the separated oil at or downstream of oil separator 125. The thermostat bulb 172 carries a temperature responsive material such as a liquid or a gas along with capillary tube 173 which is coupled to the thermostat (not shown) within panel 171. Switch contacts close the current through line 157 which includes the solenoid associated with valve 150 and which is powered from a source (not shown). The solenoid valve 150 merely cycles on and off and the function of the thermostat is to either allow injection of liquid refrigerant via port 170 to the screw compressor 126 or prevent such injection of liquid refrigerant thereon. In this case, there is no modulation or variation in the rate of flow of refrigerant to the injection port 170 and, at high temperatures, liquid refrigerant is injected into the screw compressor while at low working fluid discharge temperatures, there is an absence of liquid injection. The thermostat 172 bulb merely functions to signal the valve 150 to open or close and thus continually cycles the valve during operation of the system. Again, while the system is simplified, a possible detrimental effect is the fact that the cycling of the components may reduce the life of the same well below the design life of the major components of the machine, such as the screw compressor, etc.

Figure 4:
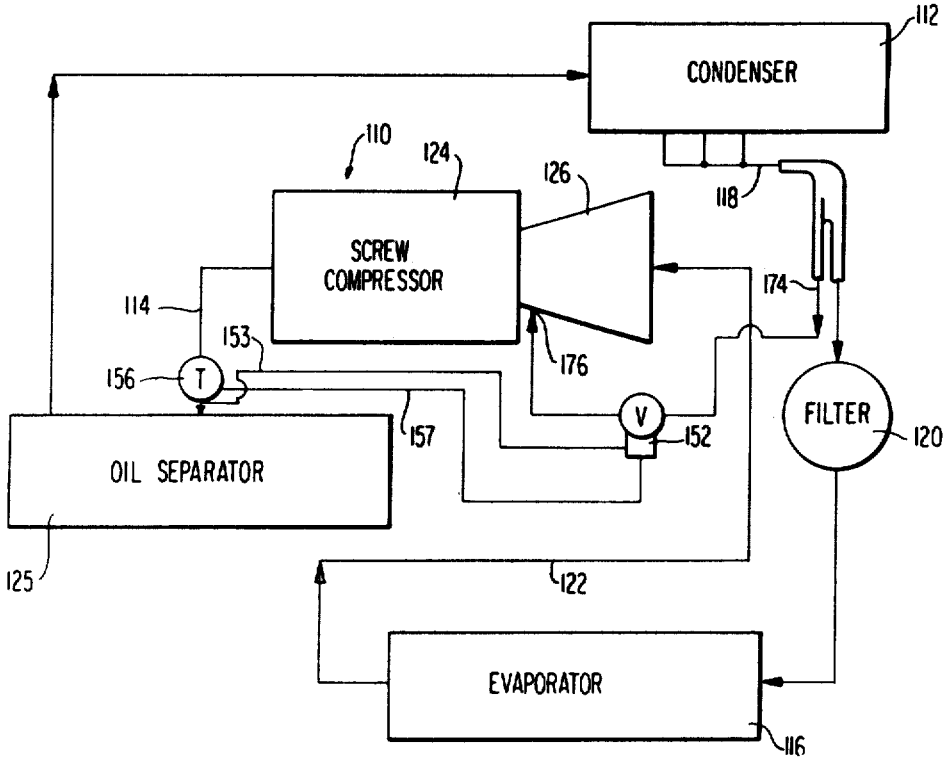
FIG. 4 is yet another schematic view of an alternate embodiment of the liquid refrigerant injection cooling system of the present invention, as applied to a refrigeration system.

Reference to FIG. 4 illustrates a fourth embodiment of the invention, again as applied to a refrigeration system essentially identical to that of FIGS. 2 and 3 and, in which case, the like components are given like numerical designations. In the embodiment of FIG. 4, however, it is desirable to increase the pressure of the liquid refrigerant in bleed line 174 prior to injection of liquid refrigerant into the compressor at injection port 176 which is very close to the discharge side of the screw compressor as compared to discharge port 170 of embodiments illustrated in FIGS. 2 and 3. In this case, the condenser 112 rather than being positioned close to and at the same height as the other components of the refrigeration system, is positioned at a much greater height. For instance, the refrigeration system may be one incorporated within a relatively tall building as, for instance, where the condenser 112 is positioned on the roof, perhaps some 10 or 15 stories above the screw compressor assembly 110, and the other components of the system which may well be in the basement of the same building. In this case, within the line 118 leading from the condenser to the drier filter 120 and at the condenser itself, the bleed line 174 creates a static pressure head relative to the injection port 176 which adds materially to the pressure of the liquid refrigerant emanating from condenser 112. In fact, the combined pressure head of the liquid refrigerant within belled line 174 may be in excess of the discharge pressure of the screw compressor discharge working fluid. Again, the system employs a temperature sensitive bulb 156 carrying a temperature expansible material as does capillary 157 to modulate operation of valve 152 proportional to the temperature of the discharge gas, further modulated by the condensing pressure for the working fluid via equalizing line 153 in similar fashion to the embodiment of FIGS. 1 and 2, the bulb 156 being operatively associated with the conduit 114 at the discharge side of the screw compressor assembly 110. Thus, the valve 152 variably controls the flow of liquid refrigerant at high pressure which enters the screw compressor through the injection port 176, in this case very close to the discharge side of the same. In each of the embodiments of FIGS. 1, 2 and 3, the condenser may be *at* a distinct height advantage over the other components of the system.

Figure 6A:
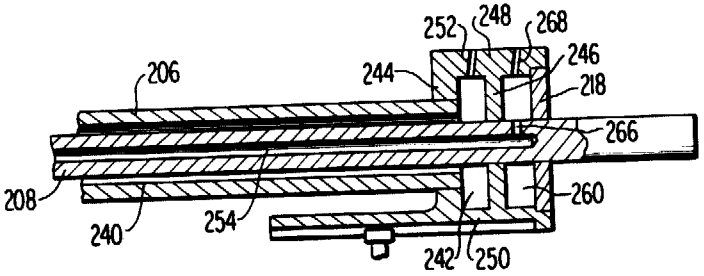
FIG. 6a is an enlarged sectional view of the slide valve forming a portion of the compressor of FIG. 6.
Figure 6:
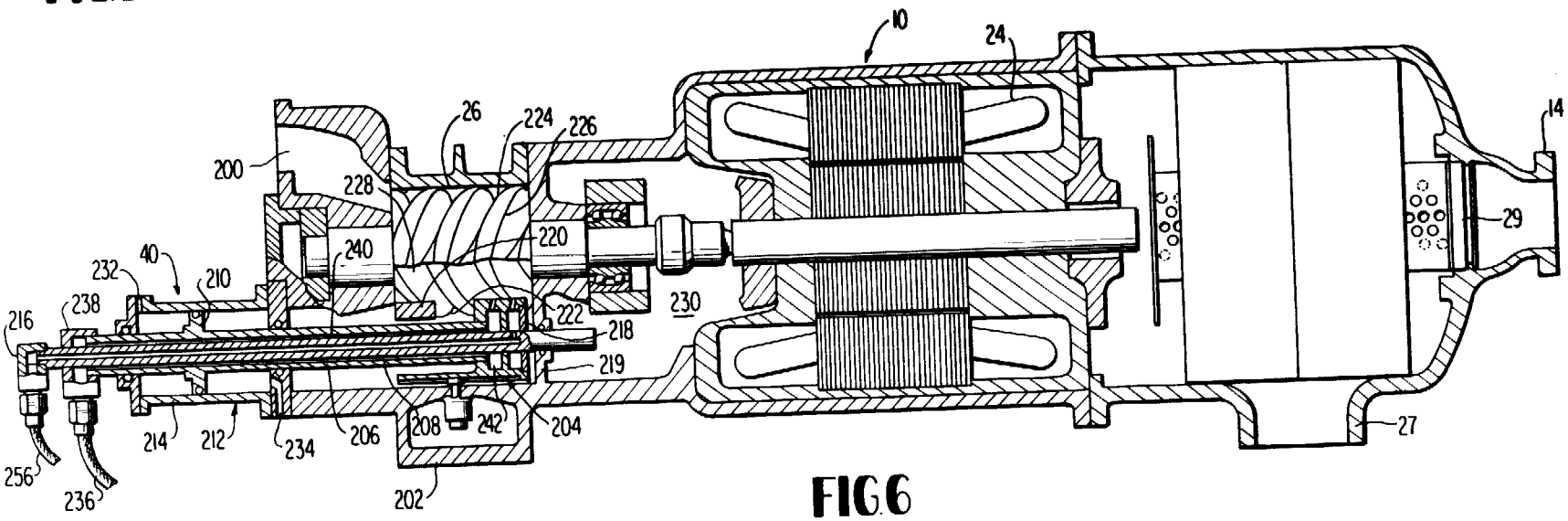
FIG. 6 is a schematic, sectional view of a portion of a helical rotary screw compressor of the type employed in the system of FIG. 1, employing a capacity control slide valve to port the liquid refrigerant to the working chamber of the compressor.

Reference to FIG. 6, illustrates an alternate embodiment of the present invention in which the liquid refrigerant is ported to the working chamber of the helical rotary screw compressor by means of a capacity control slide valve associated therewith. Like elements to the embodiment of FIG. 1 are like numbered. The screw compressor may be, in general, identical to the compressor illustrated in FIG. 1 as at 10 and [including] *of* the hermetically sealed type and including from left to right, the screw compressor itself, as at 26, the hermetic drive motor 24 and terminating in an oil separator 25 which drains the oil to a sump (not shown) through an oil discharge passage 27, the compressed refrigerant working fluid exiting through an axial port 29 to gas discharge conduit 14. To the left of the screw compressor, beyond an intake opening 200 within the compressor housing 202, is a hydraulic motor 212 fixed to one end of the rotor housing, and extending outwardly thereof. Essentially, the unloader 40 consists of a reciprocating capacity control slide valve 204 mounted within the rotor housing 202 and fixed at one end to an outer tubular shaft or rod 206 which is concentrically fixed to an inner shaft or rod 208, the slide valve 204 moving therewith at one end of both shafts 206 and 208 in response to shifting of piston 210 within cylinder 214 of the unloader hydraulic drive motor 212. The inner shaft 208 sealably carries a fitting 216, closing off one end of tubular shaft 204, while the opposite end of the inner shaft is fixed to an end wall 218 of slide valve 204. Concentric shafts or rods 206 and 208 are sealably and slidably carried by the compressor housing. Valve 204 reciprocates between limits defined by casing end wall 219 and a valve stop 220 and, when moved to the position illustrated in FIG. 6, provides a relatively large opening 222 within the bottom of the rotor housing. The working chamber 224 carries the intermeshed male and female screws or rotors 226 and 228. The capacity control slide valve forms no part of the present invention as such, and, when in the closed position, the flow of all of the gas emanating from suction passage 200 passes through the rotor housing and is compressed by the intermeshed screws for discharge at the right hand side of the screw compressor filling the discharge chamber 230. Unloading is initiated by the slide valve 204 as it moves from left to right and away from the fixed valve stop 220 to thus create the variably sized opening 222 through which the suction gas can return from the rotor housing to the inlet or suction port associated with passage 200 before the working fluid has been compressed. As there has been no sufficient amount of work done on the return gas, reduced compressor capacity is obtained at no loss. Shifting of the piston 210 occurs by selectively porting pressurized lubricating oil or hydraulic fluid selectively to one side or the other of a piston through passages 232 and 234.

The present invention in the embodiment of FIG. 6 provides the means for supplying both oil to the working chamber 224 under high pressure for lubrication and sealing of the rotary screws and also for porting liquid refrigerant to the working chamber, the expansion of which achieves cooling of the screws, the working fluid and any oil in contact therewith. In this respect, a suitable passage 240 is formed between the inner and outer shafts 206 and 208 through which oil under pressure is delivered from flexible line 236 and the fitting or coupling means 238. Passage 240 extends axially, FIG. 6a, and opens up into an oil chamber 242 defined by an end wall 244 of the slide valve 204 and a partition member 246 as well as spaced walls 248 and 250 at the top and bottom of the slide valve 204. Oil is ported directly to the working chamber 224 through one ormore inclined passages 252, thus permitting the oil to reach the intermeshed screws intermediate of the suction and discharge sides of the compressor.

The present invention is directed to the employment in this embodiment of a second axial conduit, preferably by making the inner shaft 208 hollow, that is, providing it with a bore 254 and supplying by means of a second flexible conduit 256, liquid refrigerant via bleed line 46 and coupling means or fitting 216 to a liquid refrigerant chamber 260 defined by the right hand end wall 218 of the slide valve 204, upper and lower walls 248 and 250 and the partition 246, which spaces the same and sealably surrounds the internal shaft 208. The bore 254 terminates near the right hand end, and one or more radial passages 266 permit delivery of the liquid refrigerant to chamber 260. Further, one or more oblique or inclined passages 268 downstream of the oil injection passages 252 open up into the working chamber 224 to insure liquid injection of the refrigerant at predetermined points in the compression cycle when the valve is fully closed and the compressor is working at maximum capacity. Of course, as the valve shifts from left to right and moves to open position, the point of injection for the liquid refrigerant changes and shifts mechanically, however, because the capacity is reduced, the net effect is positive rather than negative in terms of compressor efficiency, etc.

Figure 7:
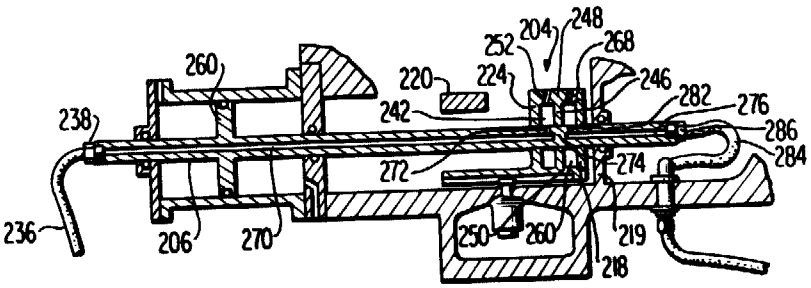
FIG. 7 is a sectional elevational view of a portion of a helical rotary compressor similar to that of FIG. 6 but illustrating an alternative mode of porting the liquid refrigerant to the screw compressor working chamber.

Rather than employ concentric tubes or shafts in which oil and liquid refrigerant passages are formed between or within any given tube or tubes, spaced parallel tubes may be employed, in which case the liquid refrigerant and the oil travel in parallel paths from the fluid motor to the slide valve, in this case the parallel flow paths terminate at respective oil and liquid refrigerant chambers. An alternative arrangement for delivering both oil to its injection port within the capacity control slide valve and the refrigerant to its injection port, is shown in FIG. 7. Again, the drawing shows a portion of a hermetic compressor similar to that of FIG. 6, and like elements are given like numerical designations. In this case, the shaft 206 connects the piston 210 of the hydraulic motor 212 to the slide valve 204, is provided with a first bore section 270 which acts as a central oil passage, this bore section being provided with one or more radial openings 272 permitting the oil to enter the oil chamber 242 again defined by end wall 244, partition 246, a top wall 248, and a bottom wall 250.

Oil under pressure is delivered to shaft 206 through line 236 via fitting 238. A plug 274 closes off the hollow shaft 206. Extending coaxially therewith but in the opposite direction is a second bore section 276. Shaft 206 protrudes through the right hand end wall 218 which forms with top and bottom walls 248 and 250 and the partition 246, a liquid refrigerant chamber 260. A series of radial passages 282 permits the liquid refrigerant which enters through a flexible conduit 284 coupled to the outer end of shaft 206 by coupling means 286 to fill the chamber and to be injected through one or more inclined passages 268 which are ported to the working chamber 224 in similar manner to the embodiment of FIG. 6, downstream of oil passages 252. In this case, the costruction is somewhat simplified in that the necessity for multiple concentric tubes or shafts is eliminated and the oil and refrigerant are essentially isolated from each other. Further, the natural introduction from opposite sides permits the injection passages of the oil to lie upstream of the refrigerant injection passages.

It is to be noted that the liquid refrigerant injection system in which refrigerant is injected through passages carried by the slide valve, is controlled identically to the manner set forth with respect to those systems illustrated in FIGS. 1–4 inclusive. Further, with respect to the systems of the present invention and with respect to the employment of a slide valve for porting the refrigerant to the working chamber, it is the injection of the liquid refrigerant which maintains lower operating temperatures for the compressor. This is especially advantageous for refrigeration systems in which water is unavailable as a coolant, especially where water is normally employed as a liquid for an oil cooler incorporated within the oil system. For a large ammonia refrigeration system which is air cooled, this system is particularly advantageous especially where the oil cooler may be dispensed with, eliminating all the problems and foul ups in terms of oil leakage and water requirements. Of course, this system has application also to refrigeration systems in which an oil cooler is required to partially maintain the oil temperature within defined limits.

In the systems previously described, the methods involve bleeding high pressure refrigerant liquid downstream of the condensor and directing it through a temperature modulated expansion valve where it enters the screw compressor working chamber through a port which lies intermediate of the suction and discharge sides of the compressor. A thermostat sensitive to the compressor discharge temperature, for instance, variably controls the volume of bled liquid refrigerant through the expansion valve which operates in conjunction with a solenoid valve normally interposed in the bleed line downstream of the liquid injection expansion valve. The solenoid valve may be controlled by a second thermostat which is sensitive to the temperature of the oil in the sump, and preferably at the discharge side of the oil pump. The temperature varies with compressor load and the solenoid valve acts to ensure that liquid refrigerant flows through the bleed line to the liquid expansion valve only during compressor operation and when the compressor is running above the minimum load condition. The solenoid valve is often subjected to chattering which is detrimental to the component life, and is also undesirable due to the noise problem.

Since the liquid refrigerant passing through the bleed line is at a pressure approximate to, or normally, slightly less than the discharge pressure of the compressor, and since it is injected into the compressor working chamber at a port location quite close to the discharge side of the compressor, the pressure differential across the bleed line is relatively small. Essentially the flow in the liquid injection assembly constituted by the bleed line is modulated by three mechanisms; (1) the thermal expansion valve; (2) the port location which is the available differential between the liquid line; and (3) the point of the compression cycle of the screw compressor at which injection occurs. This differential in turn is effected by the operating conditons relative to the built in compression ratio of the screw compressor. In other words, for a given built in compression ratio and port location, the liquid injection is shut off and the operating differential ($P_D$-$P_S$) drops to some point below the built in ratio because the liquid pressure drops to, or below the port pressure. The fourth mechanism comprises the injection port size; for instance if the port size drilled into the compressor is too small, the injection rate is restricted at high flow rates due to the $\Delta P$ in the port itself.

An investigation of valve chattering, further indicates that a condition which is normally present when valve chattering occurs is the existence of a solid column of liquid downstream of the thermal expansion. The effect of the solid column of liquid refrigerant feeding directly to the motor is to produce a "water hammer" effect. This pulsation, combined with the operation of the pilot operated solenoid valve in the marginal $\Delta P$ range, is the basic cause of the liquid injection solenoid valve chattering. Attempts have been made to minimize the valve chattering in the marginal $\Delta P$ ranges by such steps as moving the injection port towards the suction side of the compressor to increase the $\Delta P$ from discharge pressure to the injection port. While this minimizes the chances, it does not completely eliminate the possibility of operating with a solid column of liquid, however, the moving of the port may have a highly adverse effect on performance.

Further, attempts have been made to improve the pilot operated solenoid valve such that the pilot operates at approximately a zero pressure differential, but, such valves are necessarily expensive.

Figure 8:
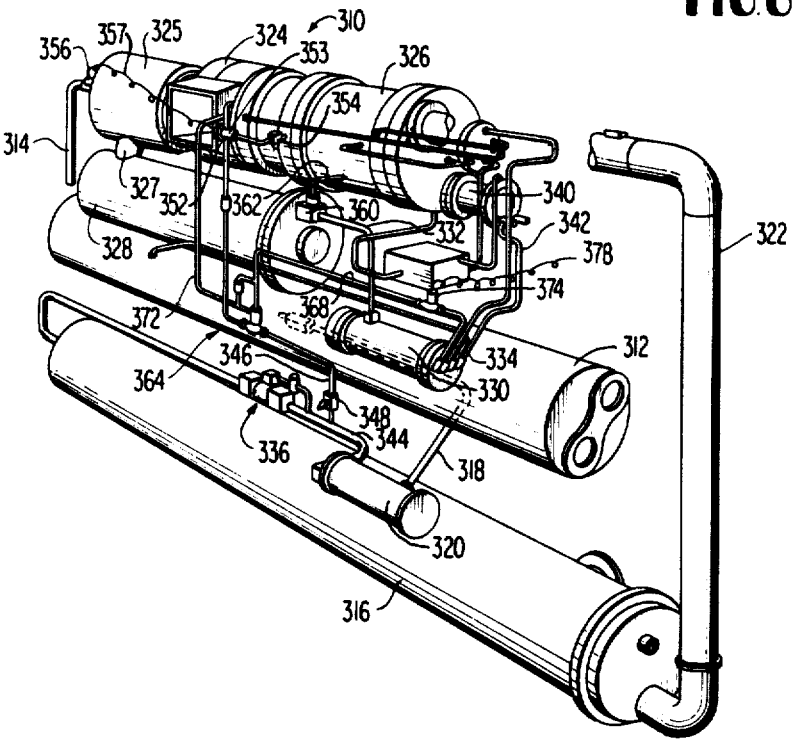
FIG. 8 is a perspective view of the refrigeration system of the rotary screw compressor type employing the improved liquid refrigerant injection cooling system of the present invention.

Reference to FIG. 8 illustrates in perspective view, a closed loop refrigeration system incorporating a rotary screw compressor which employs the improved liquid refrigerant injection cooling system of the present invention in an alternative form. The principle components of the refrigeration system comprise; the axial, rotary screw compressor assembly 310 consisting of the axial screw compressor 326, the electric drive motor 324 and oil separator 325 axially positioned in that order from the suction or intake side of the assembly as defined by conduit 322. The refrigeration system further comprises a condenser 312 which receives the compressor discharge through conduit 314 and cools the same by water or other heat exchange medium passing therethrough. The discharge of high pressure liquid refrigerant from condenser 312 occurs through conduit 318 which connects the condenser 312 to the evaporator or chiller 316, with the refrigerant passing through a filter dryer 320 incorporated within conduit 318 intermediate of condenser 312 and chiller 316. The conduit 322 connects the discharge side of the chiller or evaporator 316 to the intake or suction side of the axial screw compressor 326. Lubricating oil is circulated through the compressor assembly 310 and, in fact, mixes to a limited extent with the refrigerant working fluid during compression, but the lubricating oil is separated from the working fluid by oil separator 325 associated with the electric drive motor 324 at the downstream or discharge side of the screw compressor. The separated oil accumulates with an oil sump 328 via pipe or passage 327 and is pressurized by the oil pump (not shown) within sump 328 prior to being returned to the compressor assembly 310 after passage through an oil cleaner or filter 330. The oil filter 330 receives oil from sump 328 through line 332 and discharges the same through a plurality of lines 334 indicated generally at 334 at the discharge side of the oil filter 330. The components of the refrigeration system and the oil system as previously described, are otherwise conventional and form no part of the present invention.

In general, the refrigerant working fluid which may comprise Freon or the like, enters the compressor assembly 310 at the right hand end through inlet or intake conduit 322 in gaseous or vapor form at relatively low pressure and is copressed by the rotary screw compressor 326 to a relatively high pressure for discharge over and across the motor (not shown) of electric motor 324. The refrigerant as a high pressure gas exits from the oil separate 325 and passed to the condenser 312 where it condenses, by contacting with a coolant such as water. The high pressure liquid refrigerant then passes to the filter dryer 320 via conduit 318 and to the chiller or evaporator 316. The high pressure liquid refrigerant expands within the evaporator 316 to cool the load which may consist of water or other heat exchange fluid within the evaporator 316, with the expansion, modulation and delivery of liquid refrigerant to the evaporator or chiller being suitably controlled by means 336 within line 31 intermediate of the filter dryer 320 and the intake side of the evaporator or chiller 316.

For the purposes of the present invention, and which forms no part of the present invention, in brief, lubricating oil at relatively low temperature leaves the oil filter 330 via lines 334 to various points along the compressor assemly 310 for either lubrication purposes or to be employed as a hydraulic motor fluid for hydraulic motors such as that associated with compressor unloader 340; oil passing to the unloader for instance via line 342.

The present invention is directed to an improvement in a liquid refrigerant injection system which limits the discharge temperature of the compressor working fluid and thus the maximum temperature to which the system oil is subjected. In that respect, high pressure liquid refrigerant is bled from conduit 318 downstream of the filter dryer 320 at a bleed or tap point 344 by a small diameter, bleed tube or bleed line 346 under control of a manually operated shut-off valve 348. The liquid refrigerant is directed through bleed line 346 to a liquid injection expansion valve 352 which modulates the flow of liquid refrigerant to the screw compressor 326 and to an injection port (not shown) at the termination of line 346 which opens up into the screw compressor working chamber intermediate of the discharge and suction sides of the compressor 326. A second manually operable shut-off valve 354 is positioned within the bleed line 346 intermediate of the screw compressor injection port and the liquid expansion valve 352 to isolate the injection system when acting in conjunction with shut-off valve 348.

The liquid injection expansion valve 352 is of the modulating or variable flow type and preferably, is non-electrical in operation. A thermostat bulb 356 is coupled, at one end of a capillary tube 357 and coupled at the other end directly to valve 352. The bulb 356, and the capillary tube 357, carry a temperature expansive material which may be liquid, gas or part liquid and part gas but which expands in response to increased temperature to variably shift a movable valve element (not shown) within valve 352 and to thereby modulate the flow of liquid refrigerant within bleed line 346 to the injection port of the screw compressor 326. An equalizing line 353 couples the expansion valve 352 to the compressor 326 at the discharge side of the compressor. The liquid injection expansion valve 352 operates identically to that of the previous embodiments.

The temperature responsive bulb 356 is operatively positioned with respect to the compressor discharge, and in the illustrated embodiment it is mounted on conduit 314 which couples the discharge side of the compressor to the inlet side of condenser 312 and lies adjacent to the compressor assembly 310. The compressor discharge temperature therefore controls the flow rate of liquid refrigerant through the liquid injection expansion valve 352 such that, as the temperature of the compressor discharge increases, more liquid refrigerant is injected through the injection port associated with compressor 326 under control of the expansion valve 352 which opens to a greater extent.

Figure 9:
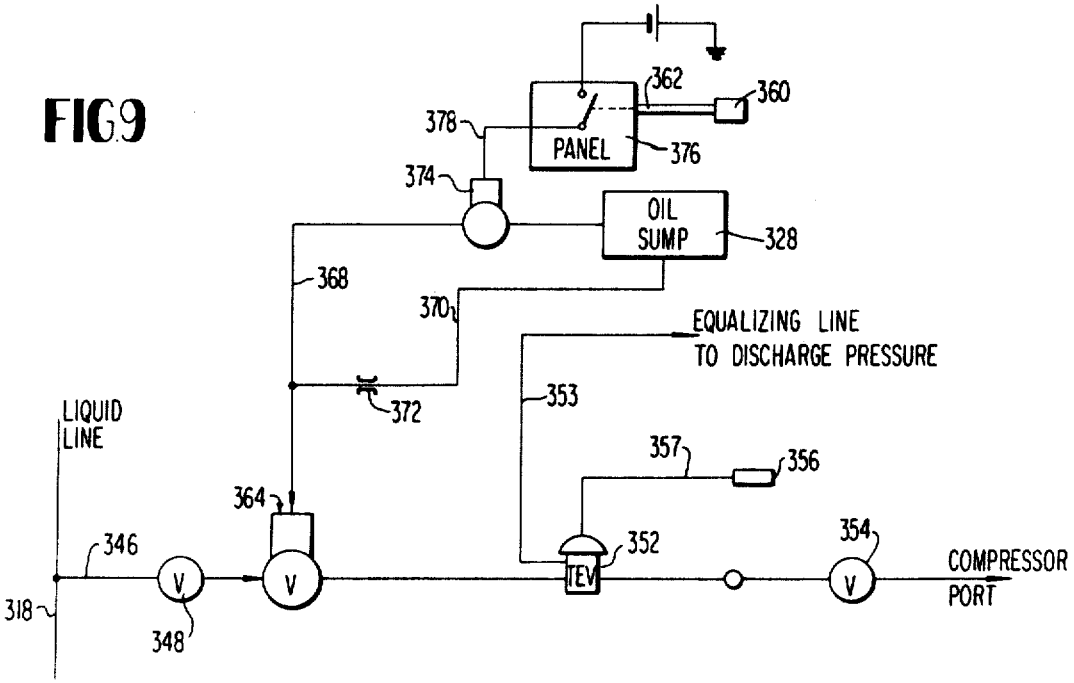
FIG. 9 is a schematic representation of the liquid injection cooling system of the present invention as applied to the refrigeration system of FIG. 8.

It is to this basic type of liquid refrigerant injection cooling system, that the present embodiment is directed. Further reference to FIGS. 8 and 9 indicate that the liquid refrigerant bleed line 346 has positioned, downstream from the manual control valve 348 a fluid pressure operated direct acting, on-off valve 364 which is connected to oil sump 328 through supply line 368 and is provided with a return or by-pass line 370. The by-pass line 370 couples the oil supply line 368 to the oil sump 328 through a fluid retriction or orifice 372 such that, when the oil passes through the supply line 368 as a result of energization of solenoid valve 374, the valve 364 is maintained in open position. However, the orifice 372 permits relief of the system pressure after the solenoid valve again closes to drain the line through restriction 372 back to the sump. Energization of solenoid valve 374 occurs much in the same manner as that of the previous embodiments. That is, a thermal expansion bulb 360 or a thermostat bulb is filled with a temperature expansive material such as liquid or gas and which is coupled by capillary tube 362 to a panel not illustrated in FIG. 8 but illustrated in block form at 376 and FIG. 9, panel 376 including a thermostat (not shown) having normally open contacts but closing in response to expansion of the material filling bulb 360 and capillary 362 so as to close an electrical circuit to the solenoid associated with solenoid valve 374 through electrical line 378. The solenoid valve therefore comprises an on-off valve permitting the selective application of high pressure oil to the direct acting fluid pressure operated valve 364. Upon application of the high pressure fluid, valve 364 moves from fully closed to fully opened position permitting the expansion valve 352 to modulate the flow of liquid refrigerant to the compressor injection port.

From the above description, it is apparent that since the shut-off valve 364 which is responsive to compressor load is not pilot operated, and since it is not dependent upon a pressure drop across the valve to maintain the valve open, chattering due to minor changes in pressure differential is eliminated. As long as the solenoid valve 374 which is responsive to the oil temperature and indirectly the compressor load is open, the direct operating, fluid pressure responsive valve 364 is maintained in open position and high pressure refrigerant liquid is available to the compressor working chamber via the injection port to the extent that the modulation valve 352 varies the flow of same. Since the operation of valve 364 is independent of the controlled medium, that is the liquid refrigerant passing through the feed line, the operation will be unaffected by modulation of the liquid flow through line 346 and the elimination of the modulation effects in terms of valve 364 virtually eliminates the chances of valve chattering.

To review the operation of the liquid injection system of this embodiment, it is apparent that liquid injection is not required by the machine during its off cycle or when the machine is running at low refrigeration loads, since the discharge temperature of the compressor working fluid at low loads is at a point where additional cooling is not required. Since the temperature of the oil is a function of the temperature of the discharge working fluid from the compressor, the oil temperature at the oil pump outlet side sump 328 is insufficient to heat thermal expansion or thermostat bulb 360 to the point where solenoid valve 374 is energized. With valve 374 closed, the high pressure oil leaving sump 328 via line 368 is cut off from the oil pressure operated valve 364 preventing flow of liquid refrigerant within bleed line 346. However, assuming that the load on the chiller or evaporator 316 reaches a predetermined minimum value necessary to cause the oil temperature in turn to rise to the point where the thermostat contacts within panel 376 close, the solenoid valve 374 is energized, opening the oil pressure line 368 to valve 364. High pressure oil flowing through line 368 acts on normally closed valve 364 to open the same with the valve remaining open but without any modulating effect on refrigerant flow in line 346. The liquid refrigerant passing through bleed line 346 is modulated by the temperature of the compressor discharge, since the thermal expansion or thermostat bulb 356 which operates on modulating valve 352 through capillary 357 is in contact with the discharge line 314 from the compressor which passes the high temperature compressed saturated gas directly to condenser 312. Further, equalizing line 353 senses condensing [temperature condensing] pressure at the discharge side of the compressor and the valve will variably inject liquid refrigerant into the compressor working chamber. The thermostat bulb 356 modulates the volume of liquid passed by the liquid injection expansion valve 352 and only the amount of liquid refrigerant is injected into the compressor which is sufficient to maintain the gas discharge temperature within a predetermined range. As load increases the discharge temperature the working fluid increases and bulb 356 senses the demand for more liquid refrigerant to be injected into the screw compressor just upstream from the discharge side of the screws. Regardless of the modulation effects on the liquid passing from the main liquid refrigerant flow line 318 connecting condenser 312 to evaporator 316 through dryer 320, valve 364 remains open as long as the load on the compressor is above the minimum value.

While the invention has been particularly shown and described with reference to preferred embodiments thereof, it will be understood by those skilled in the art that the foregoing and other changes in form and details may be made therein without departing from the spirit and scope of the invention.

What is claimed is:

[1. In a closed loop refrigeration system including, in order: a screw compressor, a condenser, and an evaporator, and having a refrigerant circulating therebetween, the improvement comprising:

means for bleeding high pressure refrigerant from said system and injecting said liquid refrigerant into said screw compressor working chamber intermediate of the suction and discharge sides of the compressor for limiting the discharge temperature of the refrigerant gas, and means responsive to compressor load for controlling said bleeding and injection means.]

[2. The refrigeration system as claimed in claim 1, wherein said means for bleeding and injecting refrigerant comprises a bleed line coupled at one end to said compressor working chamber and coupled at the other end to said system intermediate of said condenser and said evaporator and wherein a valve responsive to compressor load is positioned within said line for controlling the flow of liquid refrigerant therethrough.]

[3. The refrigeration system as claimed in claim 2, wherein said valve comprises an on-off valve and wherein a thermostat responsive to the compressor discharge temperature is operatively coupled to said on-off valve for controlling operation of the same.]

[4. The refrigeration system as claimed in claim 3, further comprising a variable flow valve positioned within said bleed line and means further responsive to compressor discharge temperature operatively coupled to said variable flow valve to modulate flow of liquid refrigerant through said bleed line.]

[5. The refrigeration system as claimed in claim 2, further comprising an oil separator at the discharge end of said screw compressor to separate oil from the refrigerant working fluid, and wherein; said means responsive to compressor load for controlling the flow of liquid refrigerant through said bleed line comprises a thermostat for sensing the temperature of said separated oil and means operatively coupling said thermostat to said valve for controlling operation of the same.]

[6. The refrigeration system as claimed in claim 5 further comprising: a variable flow valve positioned within said bleed line, and a thermostat responsive to compressor discharge temperature operatively coupled to said variable flow valve to modulate flow of liquid refrigerant through said bleed line.]

[7. The refrigeration system as claimed in claim 3, further comprising an oil separator at the discharge end of said screw compressor to separate oil from the refrigerant working fluid, and wherein; said means responsive to compressor load for controlling the flow of liquid refrigerant through said bleed line comprises a thermostat for sensing the temperature of said separated oil and means operatively coupling said thermostat to said valve for controlling operation of the same.]

[8. The refrigeration system as claimed in claim 2, wherein said condenser is located at a height, considerably above that of said screw compressor, and said bleed line leading from said condenser to said screw compressor is ported to said compressor working chamber in the vicinity of the discharge side of the same, such that the liquid refrigerant injected into the compressor working chamber under control of said valve is at or above the compressor discharge pressure.]

[9. The refrigeration system as claimed in claim 5, wherein said condenser is located at a height, considerably above that of said screw compressor, and said bleed line leading from said condenser to said screw compressor is ported to said compressor working chamber in the vicinity of the discharge side of the same, such that the liquid refrigerant injected into the compressor working chamber under control of said valve is at or above the compressor discharge pressure.]

[10. The refrigeration system as claimed in claim 7, wherein said condenser is located at a height, considerably above that of said screw compressor, and said bleed line leading from said condenser to said screw compressor is ported to said compressor working chamber in the vicinity of the discharge side of the same, such that the liquid refrigerant injected into the compressor working chamber under control of said valve is at or above the compressor discharge pressure.]

[11. The refrigeration system as claimed in claim 2, further comprising a reciprocating slide valve for variably opening the working chamber to the suction side of the screw compressor, injection passage means carried by said slide valve, and wherein, said means for coupling one end of said bleed line to said compressor working chamber comprises means operatively coupling said bleed line to said slide valve injection passage means.]

12. The refrigeration system as claimed in claim [11,] *34* wherein said valve comprises an on-off valve, and wherein a thermostat responsive to compressor discharge temperature is operatively coupled to said on-off valve for controlling the operation of the same.

13. The refrigeration system as claimed in claim [11,] *34* further comprising: a variable flow valve within said bleed line, and a thermostat responsive to compressor discharge temperature operatively coupled to said variable flow valve to modulate flow of liquid refrigerant through said bleed line.

14. The refrigeration system as claimed in claim [5,] *35* further comprising: a reciprocating slide valve for variably opening the working chamber to the suction side of the screw compressor, injection passage means carried by said slide valve, and wherein, said means for coupling one end of said bleed line to said compressor working chamber comprises means operatively coupling said bleed line to said slide valve injection passage means.

15. The refrigeration system as claimed in claim 14, wherein said valve comprises an on-off valve and wherein a thermostat responsive to the compressor discharge temperature is operatively coupled to said on-off valve for controlling operation of the same.

16. The refrigeration system as claimed in claim 14, further comprising a variable flow valve positioned within said bleed line, and a thermostat responsive to compressor discharge temperature operatively coupled to said variable flow valve for modulating the flow of liquid refrigerant through said bleed line.

[17. The refrigeration system as claimed in claim 2, wherein said valve comprises a variable position valve and wherein said means responsive to compressor load comprises means responsive to the temperature of the compressor discharge for modulating said valve.]

[18. The refrigeration system as claimed in claim 17, further comprising means responsive to the condensing temperature of the refrigerant working fluid for additionally modulating said valve.]

19. The refrigeration system as claimed in claim [18,] *41* wherein said valve *means* comprises a movable valve member normally biased to valve closed position, and means responsive to the temperature of the compressor discharge [tending to operate] *operates* in opposition to said bias, and further means responsive to the condensing [temperature] *pressure* of the refrigerant working fluid *acts* on said movable valve element tending to maintain said valve element in valve closed position.

20. The refrigeration system as claimed in claim 19, wherein said valve *means* comprises a tubular valve housing, annular means defines a fixed valve seat, a movable valve stem is concentrically positioned within said valve seat and includes an enlarged portion closing off said passage defined by the valve seat and said valve stem, a coil spring concentrically carried by said valve stem biases said valve to closed position, a diaphragm operatively contacts said valve stem at one end and defines with said valve casing, a first closed chamber and a second closed chamber on opposite sides thereof, a bulb is positioned in heat conducting relationship to the compressor outlet and is coupled to said first chamber by capillary means, said chamber, said capillary means and said bulb carry a thermo-expansive fluid, means fluid connects said second chamber directly to said compressor at its discharge side, whereby, said diaphragm is responsive to pressure differentials between said chambers and acts directly on said valve stem to open the valve *means* against the bias of said concentric coil spring.

21. In a refrigeration system including a helical rotary screw compressor, a condenser, and an evaporator, in that order, within a closed loop, with refrigerant circulating therebetween, and wherein said screw compressor includes a compressor housing defining with a pair of intermeshed screws rotatably mounted therein, a compressor working chamber and having a capacity control slide valve movable within the rotor housing and away from a fixed valve stop downstream of the compressor intake port for variably opening the compressor working chamber to said intake port, the improvement comprising: means carried by said slide valve for injecting liquid refrigerant bled from the refrigeration system downstream of the condenser into said screw compressor working chamber intermediate of the suction and discharge sides of the same and downstream of said fixed stop, for limiting the discharge temperature of the refrigerant gas.

22. The refrigeration system as claimed in claim 21, wherein: hydraulic motor means effects movement of said slide valve and includes a slidable piston, rod means couples said piston at one end and said slide valve at the other, said rod means includes conduit means for feeding said liquid refrigerant, said slide valve includes means coupled to said conduit means defining a liquid refrigerant chamber, and at least one passage extends through a wall of said slide valve and fluid connects said liquid refrigerant chamber to said working chamber downstream of said fixed valve stop.

23. The refrigeration system as claimed in claim 22, wherein; said rod means comprises a plurality of concentric tubes, said slide valve includes wall means defining a cavity concentrically surrounding said rod means, said cavity is separated by wall means intermediate of the axial ends of said cavity to form upstream and downstream closed chambers extending transversely across said cavity, and wherein first conduit means carried by said tubes means is fluid connected to a source of pressurized oil and to said first chamber, and has a passage opening up into the working chamber downstream of said fixed stop, said tubes further include second conduit means fluid coupled to said bled liquid refrigerant and to said second chamber and fluid passage means fluid coupled to said second chamber, and porting into said working chamber downstream of said first passage, whereby liquid refrigerant is injected into said working chamber downstream of the point of injection of said lubricating oil regardless of the position of said capacity control slide valve.

24. The refrigeration system as claimed in claim 22, wherein; said hydraulic motor includes a piston mechanically coupled to said slider valve by a piston rod extending therebetween, said rod extends the full length of said slide valve and axially through the center of the same, partition means define first and second axially spaced fluid sealed chambers within said slide valve, fluid passage means is carried by said shaft and extends the length of the same, plug means carried by said shaft separate said passage means at said partition means, and means fluid couple one of said fluid passages to a [course] *source* of lubricating oil, and the other of said passages on the opposite side of said plug to said bled liquid refrigerant and further passage means associated with each chamber fluid couple respective portions of said shaft passage to said chambers and said chambers to said screw compressor working chamber downstream of said fixed valve stop.

25. In a refrigeration system including, in order, a screw compressor, a condenser, and an evaporator in a closed loop with refrigeration circulating therebetween, a port opening up into said working chamber of the screw compressor intermediate of the suction and discharge sides of said compressor, a bleed line fluid coupled to said loop downstream of the condenser and to said port, a compressor discharge temperature responsive liquid injection expansion valve positioned within said bleed line for modulating the flow of liquid refrigerant through said bleed line to said port, and on-off valve means within said bleed line upstream of said expansion valve, the improvement comprising: an external source of fluid pressure, and wherein said on-off valve comprises a direct acting fluid pressure operated, valve positioned within said bleed line upstream of said liquid expansion valve, and said system further includes means responsive to compressor load for coupling said fluid pressure operated valve to said external source.

26. The refrigeration system as claimed in claim 25, wherein said external source of said fluid pressure comprises the compressor oil system, said pressure responsive on-off valve, is fluid coupled to said system oil pressure by an oil line including a solenoid valve therein, and said means responsive to compressor load for controlling the flow of fluid pressure from said source to said valve comprises a thermostat in heat receiving position with respect to said compressor discharge and means operatively coupling said thermostat to said solenoid valve.

27. The refrigeration system as claimed in claim 26, wherein said thermostat comprises a thermal expansion bulb, fixed to said conduit coupling the discharge side of the compressor to the intake side of the condenser, and said means operatively coupling said thermostat to said solenoid valve comprises an electrical circuit including said solenoid valve and normally open thermostat contacts, remote from said thermal expansive bulb and responsive to expansion of temperature responsive material carried by said bulb.

28. The refrigeration system as claimed in claim 26, further comprising a by-pass line coupled to the oil pressure supply line intermediate of the solenoid valve and the fluid pressure operated valve and acting as an oil return, and fluid restriction means carried with said by-pass line to limit flow therethrough and to insure the continued operation of said on-off valve in response to energization of said solenoid valve.

29. The refrigeration system as claimed in claim 27, further comprising a by-pass line coupled to the oil pressure supply line intermediate of the solenoid valve and the fluid pressure operated valve and acting as an oil return, and fluid restriction means carried with said by-pass line to limit flow therethrough and to insure the continued operation of said on-off valve in response to energization of said solenoid valve.

*30. In a closed loop refrigeration system including, in order, a screw compressor, a condenser, and an evaporator, a refrigerant circulating therebetween, means for bleeding high pressure liquid refrigerant from said system and injecting said liquid refrigerant into said screw compressor working chamber intermediate of the suction and discharge sides of the compressor for limiting the discharge temperature of the refrigerant gas, in response to compressor load and comprising means responsive to at least compressor discharge temperature for injecting liquid refrigerant in direct proportion to compressor load, and wherein, said means for bleeding and injecting liquid refrigerant comprises a bleed line coupled at one end to said compressor working chamber and coupled at the other end to said system intermediate of said condenser and said evaporator, and wherein a valve responsive to compressor load is positioned within said line for controlling the flow of liquid refrigerant therethrough and a thermostat is provided for sensing the temperature of said compressor discharge and means operatively couples said thermostat to said valve for controlling operation of the same, the improvement wherein:*

*said condenser is located at a height, considerably above that of the screw compressor and said bleed line leading from said condenser to said screw compressor is ported to said compressor working chamber in the vicinity of the discharge side of the same, such that the liquid refrigerant injected into the compressor working chamber under control of said valve is at or above the compressor discharge pressure.*

*31. In a closed loop refrigeration system including, in order, a screw compressor, a condenser, and an evaporator, and having a refrigerant circulating therebetween, and further comprising an oil separator at the discharge end of the screw compressor to separate oil from the refrigerant working fluid, means for bleeding high pressure liquid refrigerant from said system and injecting said liquid refrigerant into said screw compressor working chamber intermediate of the suction and discharge sides of the compressor for limiting the discharge temperature of the refrigerant gas in response to compressor load and comprising means responsive to at least compressor discharge temperature for injecting liquid refrigerant in direct proportion to compressor load, and wherein, said means for bleeding and injecting liquid refrigerant comprises a bleed line coupled at one end to said compressor working chamber and coupled at the other end to said system intermediate of said condenser and said evaporator, and wherein a valve responsive to compressor load is positioned within said line for controlling the flow of liquid refrigerant therethrough and a thermostat is provided for sensing the temperature of said separated oil and means operatively couples said thermostat to said valve for controlling operation of the same, the improvement wherein:*

*said condenser is located at a height, considerably above that of said screw compressor, and said bleed line leading from said condenser to said screw compressor*

*is ported to said compressor working chamber in the vicinity of the discharge side of the same, such that the liquid refrigerant injected into the compressor working chamber under control of said valve is at or above the compressor discharge pressure.*

*32. In a closed loop refrigeration system including, in order, a screw compressor, a condenser, and an evaporator, and having a refrigerant circulating therebetween, and further comprising an oil separator at the discharge end of the screw compressor to separate oil from the refrigerant working fluid, means for bleeding high pressure liquid refrigerant from said system and injecting said liquid refrigerant into said screw compressor working chamber intermediate of the suction and discharge sides of the compressor for limiting the discharge temperature of the refrigerant gas in response to compressor load and comprising means responsive to at least compressor discharge temperature for injecting liquid refrigerant in direct proportion to compressor load, and wherein, said means for bleeding and injecting liquid refrigerant comprises a bleed line coupled at one end to said compressor working chamber and coupled at the other end to said system intermediate of said condenser and said evaporator, and wherein an on-off valve responsive to compressor load is positioned within said line for controlling the flow of liquid refrigerant therethrough and a thermostat is provided for sensing the temperature of said separated oil and means operatively couples said thermostat to said valve for controlling operation of the same, the improvement wherein:*

*said condenser is located at a height, considerably above that of said screw compressor, and said bleed line leading from said condenser to said screw compressor is ported to said compressor working chamber in the vicinity of the discharge side of the same, such that the liquid refrigerant injected into the compressor working chamber under control of said valve is at or above the compressor discharge pressure, said valve comprising an on-off valve and said thermostat being operatively coupled to said on-off valve for controlling operation of the same.*

*33. In a closed loop refrigeration system including, in order, a screw compressor, a condenser, and an evaporator, and having a refrigerant circulating therebetween, means for bleeding high pressure liquid refrigerant from said system and injecting said liquid refrigerant into said screw compressor working chamber intermediate of the suction and discharge sides of the compressor for limiting the discharge temperature of the refrigerant gas, means responsive to compressor load for controlling said bleeding and injection means and including means responsive to at least compressor discharge temperature for injecting liquid refrigerant in direct proportion to compressor load, said means for bleeding and injecting refrigerant comprising a bleed line coupled at least at one end to said compressor working chamber and coupled at the other end to said system intermediate of said condenser and said evaporator, and a valve responsive to compressor load being positioned within said line for controlling the flow of liquid refrigerant therethrough, the improvement comprising:*

*a reciprocating slide valve for variably opening the working chamber to the suction side of the screw compressor, injection passage means carried by said slide valve, and wherein, said means for coupling one end of the bleed line to said compressor working chamber comprises means operatively coupling said bleed line to said slide valve injection passage means.*

*34. In a closed loop refrigeration system including, in order: a screw compressor, a condenser, and an evaporator, and having a refrigerant circulating therebetween, means for bleeding high pressure liquid refrigerant from said system and injecting said liquid refrigerant into said screw compressor working chamber intermediate of the suction and discharge sides of the compressor for limiting the discharge temperature of the refrigerant gas, including means responsive to at least compressor discharge temperature for injecting liquid refrigerant in direct proportion to compressor load, a bleed line coupled at one end to said compressor working chamber and coupled at the other end to said system intermediate of said condenser and said evaporator, and a valve responsive to compressor load positioned within said line for controlling the flow of liquid refrigerant therethrough, the improvement wherein:*

*an oil separator is positioned at the discharge end of the screw compressor to separate oil from the refrigerant working fluid, said means responsive to compressor load for controlling the flow of liquid refrigerant through said bleed line comprises a thermostat for sensing the temperature of the separated oil and means operatively coupling said thermostat to said valve for controlling operation of the same, and wherein a reciprocating slide valve is operatively mounted on said compressor for opening the working chamber to the suction side of the screw compressor, injection passage means is carried by the slide valve, and wherein said means for coupling one end of the bleed line to said compressor working chamber comprises means operatively coupling said bleed line to said slide valve injection passage means.*

*35. A method of operating a refrigeration plant comprising: a refrigerant flow circuit including a compressor of the screw rotor type, a condenser and an evaporator; means for circulating oil and for injecting said oil into the compression chambers of said compressor; an oil separator provided in said circuit between the outlet of said compressor and the inlet of said condenser; and means for introducing liquid refrigerant into a circuit portion between the inlet of the compressor and the inlet of said oil separator;*

*comprising controlling the introduction of the liquid refrigerant into said circuit portion such that the temperature in the oil separator is kept at a level only slightly above the liquefaction temperature of the refrigerant at the pressure prevailing in the oil separator but is prevented from falling to said liquefaction temperature.*

*36. The method as defined in claim 35 comprising controlling the introduction of said liquid refrigerant into the compression chambers of said compressor.*

*37. A refrigeration plant comprising:*

*a refrigerant flow circuit including a compressor of the screw rotor type, a condenser and an evaporator;*

*means for circulating oil and for injecting said oil into the compression chambers of said compressor;*

*an oil separator provided in said circuit between the outlet of said compressor and the inlet of said condenser;*

*means for introducing liquid refrigerant into a circuit portion between the inlet of the compressor and the inlet of said oil separator;*

*means responsive to at least one parameter indicative of the difference between the temperature in the oil separator and the temperature in the condenser;*

*adjustable means for varying the quantity of liquid refrigerant introduced into said circuit portion; and*

*means connecting said responsive means with said adjustable means to control said adjustable means such*

*that said temperature difference is kept small but is prevented from dropping down to zero.*

*38. The plant according to claim 37, wherein said liquid refrigerant is introduced into the compression chambers of said compressor and said adjustable means comprises a valve means coupled in the path of said liquid refrigerant to said compressor, said valve means being opened to increase the quantity of said liquid refrigerant introduced into said compressor.*

* * * * *